United States Patent
Franz et al.

(10) Patent No.: US 10,423,242 B2
(45) Date of Patent: Sep. 24, 2019

(54) HEAD PROTECTION DEVICE

(71) Applicant: Dräger Safety AG & Co. KGaA, Lübeck (DE)

(72) Inventors: Frank Franz, Stockelsdorf (DE); Stefan Morley, Lübeck (DE); Livio Fornasiero, Bliestorf (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 265 days.

(21) Appl. No.: 15/666,910

(22) Filed: Aug. 2, 2017

(65) Prior Publication Data
US 2018/0039342 A1 Feb. 8, 2018

(30) Foreign Application Priority Data
Aug. 3, 2016 (DE) .................. 10 2016 009 364

(51) Int. Cl.

| | |
|---|---|
| *G06F 3/0346* | (2013.01) |
| *G01S 17/06* | (2006.01) |
| *A62B 17/00* | (2006.01) |
| *G06F 3/0484* | (2013.01) |
| *G08B 21/18* | (2006.01) |

(52) U.S. Cl.
CPC .......... *G06F 3/0346* (2013.01); *A62B 17/003* (2013.01); *G01S 17/06* (2013.01); *G06F 3/04847* (2013.01); *G08B 21/182* (2013.01)

(58) Field of Classification Search
CPC ...... G02B 27/017; G06F 3/0346; G01S 17/06
USPC ....................................... 2/410–9
See application file for complete search history.

(56) References Cited

U.S. PATENT DOCUMENTS

2018/0249087 A1* 8/2018 Arnold ...................... G06F 3/16

FOREIGN PATENT DOCUMENTS

| CN | 203986301 U | * | 12/2014 |
|---|---|---|---|
| CN | 208550138 U | * | 3/2019 |
| KR | 10 0 816 555 B1 | | 3/2008 |
| KR | 10 2014 0 006 663 A | | 1/2014 |
| KR | 20140006663 A | * | 1/2014 |
| KR | 10 2016 0 015 089 A | | 2/2016 |
| KR | 101696751 B1 | * | 1/2017 |
| KR | 20180114756 A | * | 10/2018 |

OTHER PUBLICATIONS

The University of Sheffield: "Sensor helmet could mean firefighters are not left in the dark": http://www.sheffield.ac.uk/news/nr/sensory-helmet-for-fire-fighters-1.265758.

* cited by examiner

*Primary Examiner* — Michael Pervan
(74) *Attorney, Agent, or Firm* — McGlew and Tuttle, P.C.

(57) ABSTRACT

A head protection device has a distance-measuring device with a spatial directional characteristic, a light beam generation device as well as at least one control unit. The distance-measuring device is configured to determine distance information relative to a focusing range of the spatial directional characteristic and to provide the determined distance information to the control unit. The light beam generation device is configured to generate a light beam in the direction of the focusing range. The control unit provides a control signal, which indicates a request for a brightness modulation frequency of the light beam as a function of the distance information, to the light beam generation device on the basis of the distance information in a first operating mode.

18 Claims, 5 Drawing Sheets

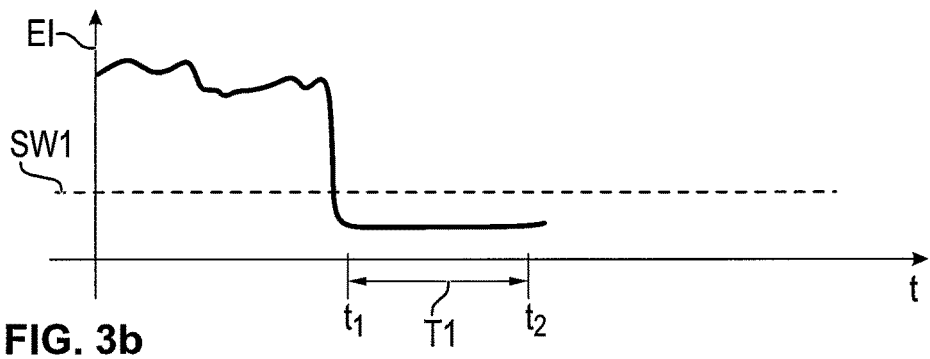
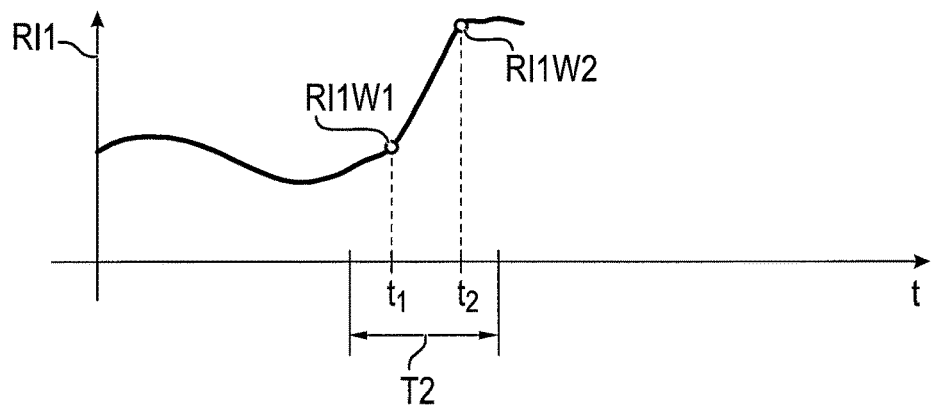
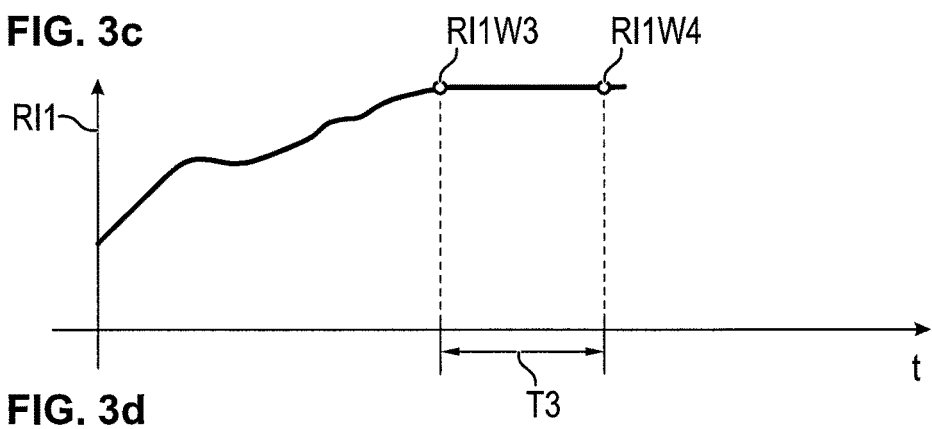
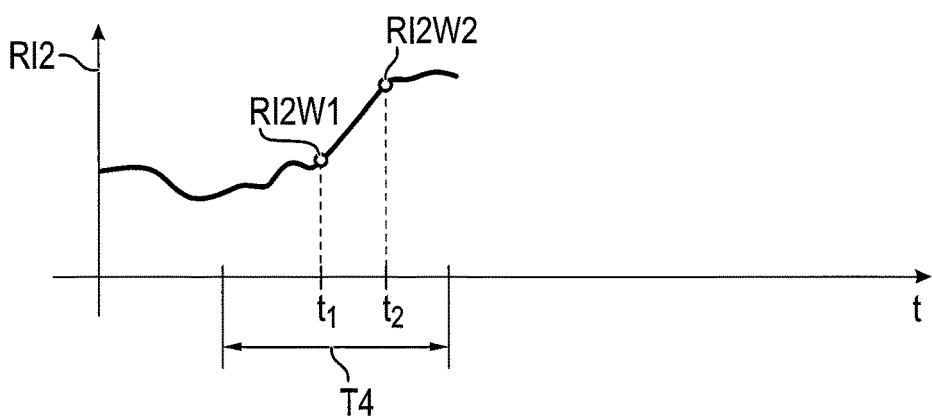

HEAD PROTECTION DEVICE

CROSS REFERENCE TO RELATED APPLICATIONS

This application claims the benefit of priority under 35 U.S.C. §119 of German Application 10 2016 009 364.1 filed Aug. 3, 2016, the entire contents of which are incorporated herein by reference.

FIELD OF THE INVENTION

The present invention relates to head protection devices, and more particularly relates to head protection devices with a distance-measuring device with a spatial directional characteristic, a light beam generation device, as well as at least one control unit.

BACKGROUND OF THE INVENTION

Rescue teams, for example, firefighters, often have only limited or reduced possibility for orientation in space in smoke-filled or dusty rooms because of possibly impaired visibility. It also frequently happens in rooms in which rescue teams operate that increased humidity of the air develops in the form of fog or water spray, which may likewise limit visibility.

It is to be avoided, in particular, for the body, especially the head, of a member of a rescue team to collide with an object. Orientation in space frequently happens by the members of the rescue team using their hands for feeling around in front of them in the room in which the rescue operation is being performed, and the range in which objects can be detected is limited due to the length of the arms.

So-called thermal image cameras are known, which a member of a rescue team can hold in his hand and whose display unit can be viewed by the member of the rescue team in order to then obtain information on the heat distribution in the room in which the rescue operation is being performed in the display area.

Further, a solution involving a helmet, according to which one or more distances are measured on the basis of ultrasound sensors and wherein an indicator of a distance is indicated to the user of the helmet by means of vibrations on the inside of the helmet, is known. This solution is known from http://www.sheffield.ac.uk/news/nr/sensory-helmet-for-fire-fighters-1.265758. It is disadvantageous here that a tactile perception by the user of the helmet is necessary, as a result of which a certain stress level may be exceeded in certain situations.

SUMMARY OF THE INVENTION

An object of the present invention is to provide a head protection device for rescue teams, which offers to the user information concerning to a distance between the head protection device and an object in such a manner that a certain stress level is not exceeded for the user.

According to the present invention, a head protection device is provided having a distance-measuring device with a spatial directional characteristic, a light beam generation device as well as at least one control device. The distance-measuring device is configured to determine distance information relative to a focusing range of the spatial directional characteristic and to provide it to the control unit. The light beam generation device is configured to generate a light beam in the direction of the focusing range. The control unit provides a control signal for the light beam generation device on the basis of the distance information in a first operating mode. The control signal indicates a request for a brightness modulation frequency of the light beam as a function of the distance information. The light beam generation device modulates the brightness of the light beam as a function of the indicated modulation frequency.

The head protection device according to the present invention is advantageous because the distance information determined by the distance-measuring device is not offered to the user by means of tactile perception, but by means of a change in the brightness modulation frequency, so that only the brightness intensity of the light beam changes as a function of the distance information, but no further, additional optical information, e.g., tactile information, needs to be perceived by the user. A burden for the user due to stress is avoided or minimized hereby.

The control unit of the head protection device is preferably configured to provide a control signal, which indicates a request for switching off the light beam generation device, for the light beam generation device in case the distance information is continuously below a predefined threshold value for a predefined duration.

This embodiment of the head protection device is advantageous because it is possible hereby to automatically switch off the light beam generation device for the predefined duration by holding the hand in front of the distance-measuring device. Consequently, the user does not need to press a push switch and/or key, which would be unfavorable for members of rescue teams especially because they often use protective gloves and thus can operate push switches and/or keys for switching off the beam generation device with their fingers only with difficulty.

The control signal of the head protection device is preferably a first control signal, and the head protection device further has at least one acceleration or angular rate sensor, which is configured to provide acceleration or angular rate information relative to a horizontal rotation of the head protection device for the unit, as well as further a display unit with a two-dimensional display area, wherein the control unit is further configured to determine in a second operating mode, on the basis of the acceleration or angular rate information, rotational orientation information, which indicates a horizontal rotational orientation of the head protection device; to set a temporal relationship between the horizontal rotational orientation information and the distance information, and to provide a second control signal for the display unit, which control signal indicates a request for a brightness selection and/or a color selection of partial areas of the display area as a function of the distance information and a request for the horizontal rotational orientation information. The display unit performs a brightness selection and/or a color selection of partial areas of the display area as a function of the second control signal.

This embodiment of the head protection device is advantageous because not only is current distance information indicated for the user in relation to a current rotational orientation of the head protection device by means of the light beam or the brightness modulation frequency of the light beam, but, further, already detected distance information in relation to detected horizontal rotational orientation information is set into a temporal relationship and stored, so that this already detected distance information and rotational orientation information can then be offered to the user in the display area of the display unit by a change in a brightness and/or in a color of a partial area. The more horizontal rotational orientation of the head protection device and hence also of the distance-measuring device is performed by the user, the more distance information is obtained in relation to the corresponding rotational orientation information, so that this information is offered to the user on the display unit in the display area not only at a current time of the information detection, but at later times as well.

The head protection device preferably has a control unit, which is configured to change over into the second operating mode when an indicator for a change over time in the horizontal rotational orientation exceeds a predefined threshold value. This is preferably achieved by the control unit being configured to change over into the second operating mode when an absolute value of a difference between two horizontal rotational orientation information values within a predefined maximum duration exceeds a predefined threshold value.

This embodiment of the head protection device is advantageous because it is possible, by bringing about a rapid change in the horizontal rotational orientation of the head protection device, for example, by a so-called gesture in the form of shaking the head, to change over from the first operating mode into the second operating mode automatically in order to activate the display unit. Consequently, if the user would first like to obtain distance information in the first operating mode only through a change in the brightness modulation frequency of the light beam, but he then would like to receive different distance information in relation to different horizontal rotational orientation information on the display unit later, it is not necessary for this for the user to operate a switch or key with his hands or fingers, but he can change over from the first operating mode into the second operating mode in a simple manner by the gesture of shaking his head.

The head protection device preferably has a display area, said display area having a symmetry axis dividing the display area into two partial areas of equal size, and the control unit further being configured to detect current horizontal rotational orientation information present immediately after the exceeding and to select a brightness selection and/or a color selection of a partial area located on the symmetry axis as a function of distance information associated with the current horizontal rotational orientation information.

This embodiment of the head protection device is advantageous because when the second operating mode is activated, the distance information with the horizontal rotational orientation information that was detected or determined immediately at the time of or after activation of the second operating mode is displayed along the symmetry axis of the display area. As a result, the display area is oriented into two partial areas of equal size corresponding to the space areas that are located to the left and right to its direction of view at the moment of the activation of the second operating mode.

The head protection device is preferably configured such that the brightness selection requested by means of the second control signal and/or the color selection requested by means of the second control signal change as a function of a continuing time.

This embodiment of the head protection device is advantageous because the selection of the brightness and/or the color selection of the partial areas of the display area for displaying past distance information in relation to past horizontal rotational orientation information are not displayed for an unlimited duration in the display area. Depending on the continuing time, partial areas are displayed, instead, less dominantly in the display area with a reduced brightness and/or with a changing color selection based on the dependence on the continuing time. Consequently, only distance information in relation to horizontal rotational orientation information that was obtained within a time window that just ended is thus offered to the user after a duration that has ended. Older, possibly no longer relevant information is then no long longer taken into account for identifying partial areas of the display area. It becomes possible hereby that the user can then change his position in the room in which the rescue operation is being performed after a first detection of distance information in relation to horizontal rotational orientation information and the display of this information in the display area and he can then obtain new distance information in relation to new horizontal rotational orientation information by a repeated variation of the horizontal rotational orientation of the head protection device, and the older, past distance information is automatically no longer used to identify the partial areas of the display area, but only the newly obtained distance information is used.

The spatial directional characteristic preferably is a first spatial directional characteristic, and the head protection device further has a temperature-measuring device with a second spatial directional characteristic, the temperature-measuring device being configured to determine temperature information relative to a focusing range of the second spatial directional characteristic and to provide it to the control unit, the control unit being further configured to set the temperature information into a temporal relationship with the horizontal rotational orientation information and to select the second control signal such that the second control signal indicates a request for a color selection of partial areas of the display area as a function of the temperature information and the horizontal rotational orientation information.

This embodiment of the head protection device is advantageous because not only is a spatial position of objects offered as information to the user by means of an identification of partial areas in the display area, but temperature information relative to the objects, which is displayed in the display area by means of the identified partial area, is also accessible for the user.

The spatial directional characteristic is preferably a first spatial directional characteristic, and the head protection device further has a temperature-measuring device with a second spatial directional characteristic, and the temperature-measuring device is configured to determine temperature information relative to a focusing range of the second spatial directional characteristic and to provide the determined temperature information to the control unit, the control being further configured to select the control signal on the basis of the temperature information such that the control signal further indicates a request for a color selection of the light beam as a function of the temperature information.

This embodiment of the head protection device is advantageous because information on a temperature in the area of the measured distance can be offered to the user simultaneously with the distance information itself, wherein the distance information influences the brightness modulation frequency of the light beam and the information relative to the temperature obtained can be displayed to the user simultaneously by the color selection of the light beam.

The head protection device is preferably configured such that the control unit is configured to select the second control signal such that the control signal indicates a request for displaying a predefined two-dimensional geometric element as a function of the current rotational orientation information.

This embodiment of the head protection device is advantageous because a current horizontal or vertical rotational orientation of the head protection device or of its current direction of view can be offered to the user in the display area.

The head protection device is preferably configured such that the control unit is configured to limit the distance information to a predefined maximum.

This embodiment of the head protection device is advantageous because a user of the head protection device as a member of a rescue team or as a firefighter may possibly only be interested in obtaining distance information within a predefined range or a maximum distance. The display area is automatically scaled hereby.

The head protection device is preferably configured such that the control unit is configured to determine whether an indicator for a change over time in the horizontal rotational orientation is lastingly below a predefined threshold value for a predefined duration and to provide an additional control signal, which indicates a request for switching off the display unit, to the display unit if said indicator is below the threshold value. This is achieved especially by the control unit being configured to determine whether a first time derivative of the horizontal rotational orientation information is lastingly below a predefined threshold value within a predefined duration, and to provide an additional control signal, which indicates a request for switching off the display unit, if said first time derivative is below the predefined threshold value.

This embodiment of the present invention is advantageous because it becomes possible hereby for the user to switch off the display unit automatically during the second operating mode by holding the head protection device in a resting position for a predefined duration by means of a button and thus he can bring about the switching off of the display unit directly by the posture of his head. As a result, it is not necessary for the user to switch off the display unit by means of his hand or a finger on a key or switch.

The head protection device is preferably configured such that the at least one acceleration or angular rate sensor is further configured to provide additional acceleration or angular rate information relative to a vertical rotation of the head protection device to the control unit, the control unit being further configured to determine in a third operating mode, on the basis of the additional acceleration or angular rate information, vertical rotational orientation information, to set the vertical rotational orientation information into a temporal relationship with the distance information and to select the second control signal such that the second control signal indicates a request for a brightness selection and/or for a color selection of partial areas of the display area as a function of the distance information and of the vertical rotational orientation information.

This embodiment of the head protection device is advantageous because it becomes possible hereby for the user to collect distance information and corresponding vertical rotational orientation information in the form of a vertical rotational orientation of the head protection device by vertically nodding his head, and this information will then be offered to him by means of a brightness selection and/or a color selection of partial areas of the display area.

The head protection device is preferably configured such that the control unit is configured to change over into the third operating mode when an indicator for a change over time in the vertical rotational orientation exceeds a predefined threshold value within a predefined maximum duration. This is achieved especially by the control unit being configured to change over into the third operating mode when an absolute value of a difference between two vertical rotational orientation information values exceeds a predefined threshold value within a predefined maximum duration.

This embodiment of the head protection device is advantageous because the user is enabled hereby to change over from the second operating mode into the third operating mode by rapidly changing the vertical rotational orientation of the head protection device by moving his head. This may be brought about, for example, by a so-called gesture in the form of nodding.

The head protection device is preferably configured such that the control unit is configured to detect whether the vertical rotational orientation information is below a predefined threshold value and whether the distance information at the same time exceeds a predefined threshold value, and to select the second control signal if this is detected such that the second control signal indicates a request for outputting an optical warning.

This embodiment of the head protection device is advantageous because in the case in which the user deflects the vertical rotational orientation of the head protection device into a lower area, the user is informed, if the distance information at the same time exceeds a predefined threshold value, which may be due, for example, to a hole located in front of the user in the floor area, of the presence of the hole in the floor area by means of the optical warning. The optical warning is preferably outputted in the display area of the display unit.

The head protection device is preferably configured such that the control unit is configured to detect whether the distance information is below a predefined threshold value and to select the second control signal in case of detection such that the second control signal indicates a request for the output of an optical warning.

This embodiment of the head protection device is advantageous because distance information below the threshold value may be caused, for example, by the fact that an object, with which the user could possibly collide, is located at a close range in front of the head protection device and hence at a close range in front of the user's head. The user is informed of this by means of the optical warning, which is preferably outputted to the display area.

The present invention will be explained in more detail below on the basis of special embodiments without limitation of the general inventive idea on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3a is a graph showing a falling below a threshold value by distance information;

FIG. 3b is a graph showing changes in horizontal rotational orientation information;

FIG. 3c is a graph showing changes in horizontal rotational orientation information;

FIG. 3d is a graph showing a changes in vertical rotational orientation information;

DESCRIPTION OF THE PREFERRED EMBODIMENTS

Figure 1:
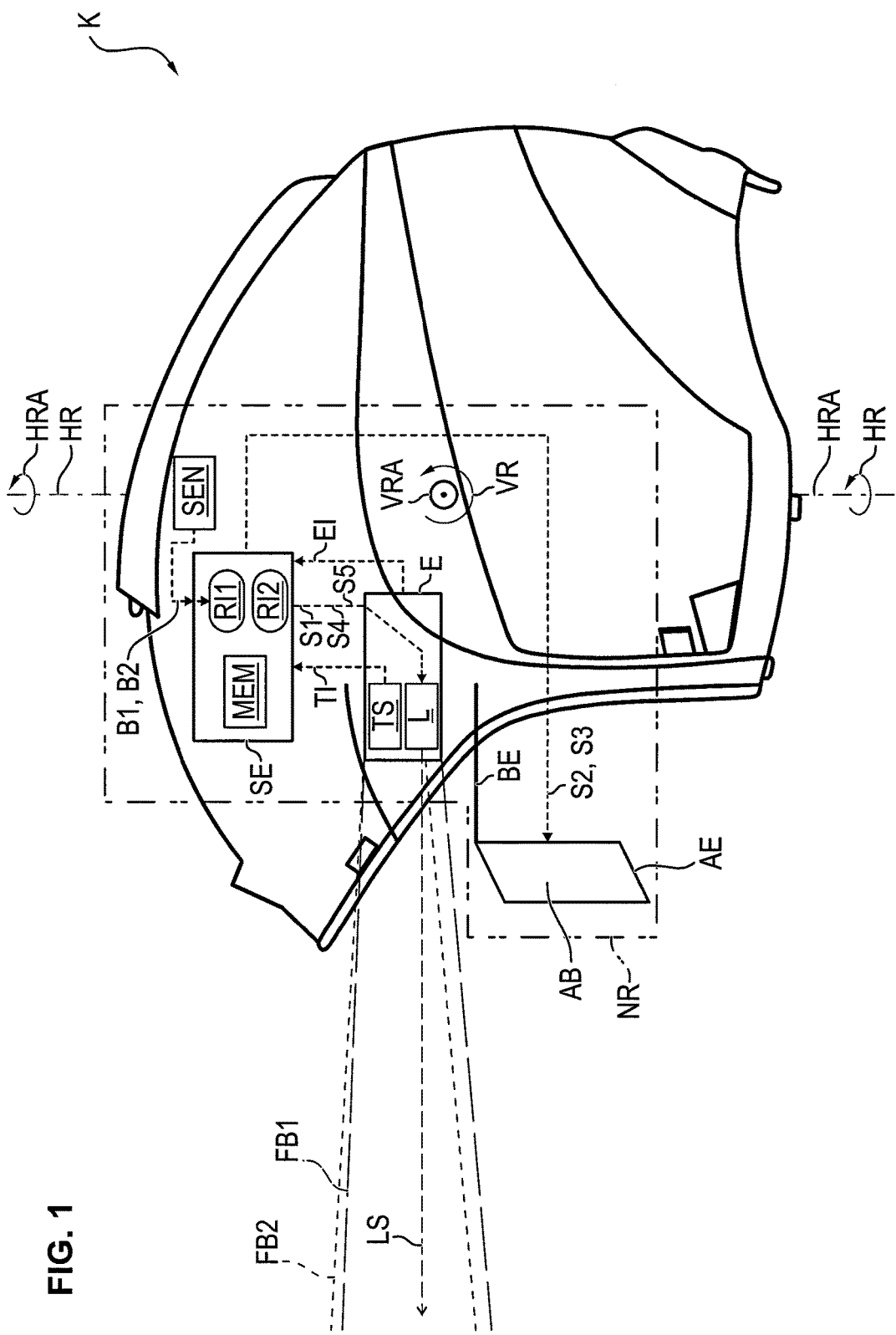
FIG. 1 is a schematic view showing an embodiment of the head protection device according to the present invention.

Referring to the drawings, FIG. 1 shows an embodiment of the head protection device K according to the present invention.

The head protection device K has a distance-measuring device E, which has a spatial directional characteristic. The directional characteristic is represented by means of a focusing range FB1 of this directional characteristic. The distance-measuring device E is configured to determine distance information relative to the focusing range FB1. The distance information EI is provided by the distance-measuring device E to a control unit SE.

The distance-measuring device E is preferably a distance-measuring unit based on ultrasound technology or based on radar technology. The distance-measuring device E consequently detects, relative to the focusing range FB1 of the distance-measuring device E, a distance from an object located in the focusing range FB1. This is provided as corresponding distance information EI by the device E.

The head protection device K further has a light beam generation device L. The light beam generation device L is configured to generate a light beam LS. The distance-measuring device E and the light beam generation device L are attached to or positioned on the head protection device K such that the light beam LS of the light beam generation device L is directed in the direction of the focusing range FB1 of the distance-measuring device. The light beam generation device L is preferably attached to or positioned directly on the distance-measuring device E such that the light beam LS of the light beam generation device L is directed in the direction of the focusing range FB1 of the distance-measuring device E.

In a first operating mode, the control unit SE uses the distance information EI to provide a control signal SE for the light beam generation device L on the basis of this information EI. The control unit SE selects the control signal S1 in a first operating mode such that the control signal S1 indicates a request for a brightness modulation frequency for modulating the brightness or the intensity amplitude of the light beam LS as a function of the distance information EI.

Figure 5A:
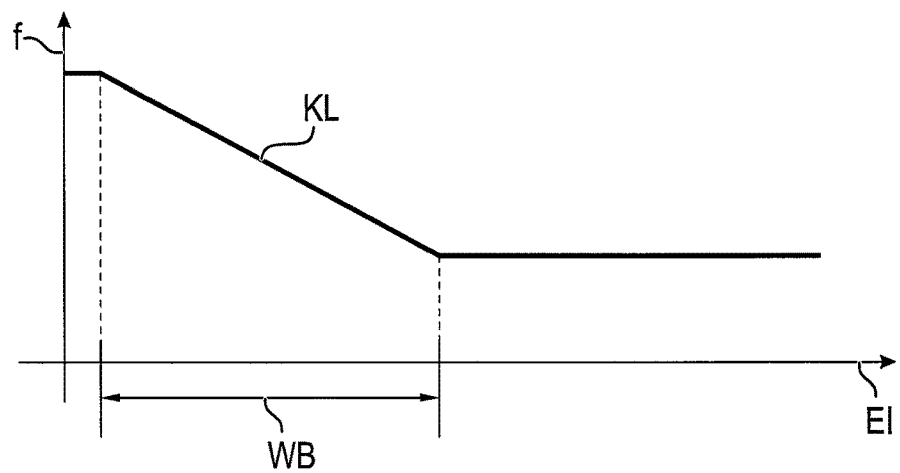
FIG. 5a is a graph showing a characteristic for a change in a brightness modulation frequency as a function of distance information.

The control unit SE preferably uses a characteristic KL provided in a memory unit MEM, as is shown in FIG. 5a. FIG. 5a shows the characteristic KL, according to which the brightness modulation frequency f is selected as a function of the distance information EI. If the distance information EI decreases, the brightness modulation frequency f increases, preferably at least within a certain value range WB.

Figure 5B:
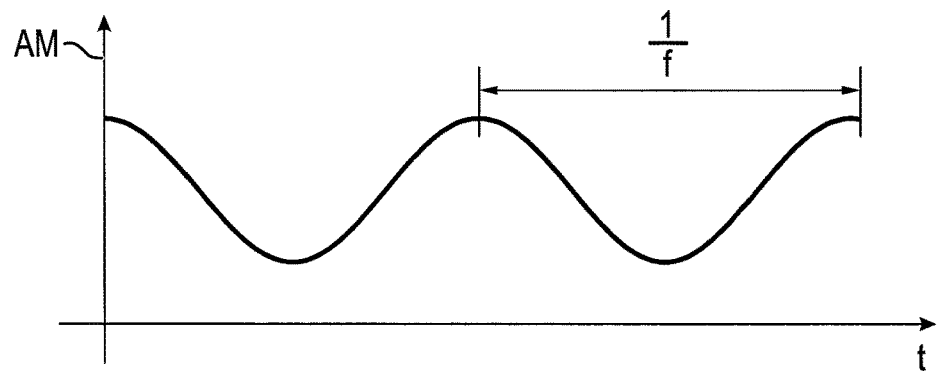
FIG. 5b is a graph showing amplitudes and brightness values, which are modulated by means of a modulation frequency.

FIG. 5b shows for this an amplitude AM or an intensity of the light beam as a function of the time t, wherein the amplitude AM is modulated as a function of the brightness modulation frequency f. If the brightness modulation frequency f is increased, because, for example, the distance information EI from FIG. 5a decreases, this results in an increase in the brightness modulation frequency or blink frequency of the light beam.

Figure 2A:
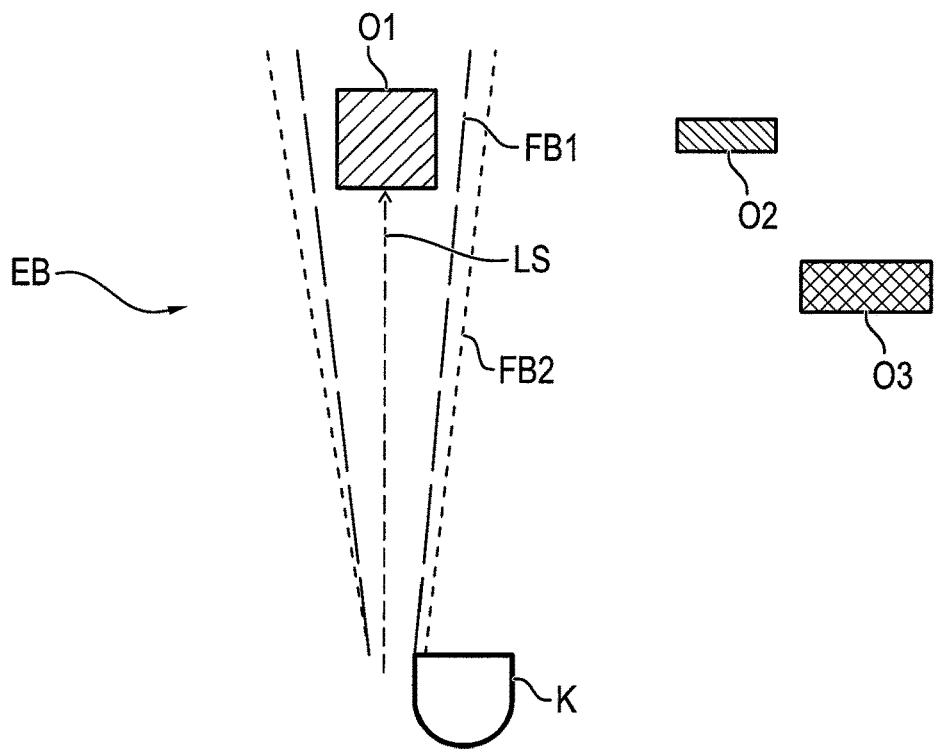
FIG. 2a is a schematic top view showing the head protection device in an area in which a rescue operation is carried out.

FIG. 2a shows a top view of an area EB, in which a rescue operation is carried out, in which the head protection device K is located. The distance-measuring device and the light beam generation device are not shown explicitly in FIG. 2a. However, the focusing range FB1 of the distance-measuring device is shown in FIG. 2a. The light beam LS points in the direction of the focusing range FB1. A distance or distance information, which is determined by the distance-measuring device relative to the focusing range FB1 by an object O1 located in the distance being detected, is then converted by selecting the control signal by means of the control unit into a change in the brightness modulation frequency of the light beam LS, preferably by using the characteristic KL shown in FIG. 5a.

If the user rotated the head protection device K horizontally in the first operating mode, so that the focusing range FB1 would detect the object O2, distance information that would be different from the distance information for the object O1 would be determined and provided for this, because the object O2 is located farther away from the head protection device K than the object O1. Consequently, the brightness modulation frequency f would now be reduced compared to the case in which the object O1 is detected.

FIG. 3a shows a possible change in the distance information EI over time t. A predefined time period T1 is shown between two times t1 and t2. The distance information EI is consistently below a predefined threshold value for this predefined time period T1. The control unit therefore provides, according to FIG. 1, a control signal S4 for the light beam generation device L, which signal indicates a request for switching off the light beam generation device.

This switching off of the light beam generation device L may be brought about by the user, for example, by holding his hand lastingly in front of the distance-measuring device E for the time period T1, so that the distance information EI is caused to drop below the threshold value SW1. The user does not consequently have to press any switch or key in order to switch off the light beam generation device automatically.

According to FIG. 1, the head protection device K preferably has one or more acceleration and/or angular rate sensors SEN. The sensor SEN is configured to determine acceleration or angular rate information B1 relative to a horizontal rotation HR of the head protection device K about an axis of rotation HRA of a horizontal rotation and to provide it to the control unit SE.

Further, the head protection device K preferably has a display unit AE, which has a two-dimensional display area AB. The display unit AE is preferably attached to the head protection device K by means of a fastening unit BE. Based on the fastening BE, the display unit AE with its display area AB is preferably located in a field of view of an individual eye of or both eyes of the user. As a result, the user can perceive the display area AB in a simple manner. In case the display area is essentially perceptible only within the field of view of a single eye, the user can use his other eye to perceive the area in which the rescue operation is being carried out without restrictions.

In a second operating mode, the control unit SE determines horizontal rotational orientation information RI1 on the basis of the acceleration or angular rate information B1. This horizontal rotational orientation information RI1 indicates a horizontal rotational orientation of the head protection device K about the axis of rotation HRA of the horizontal rotation.

The control unit SE further sets the horizontal rotational orientation information RI1 into a temporal relationship with the distance information EI.

The control unit SE provides a control signal S2 for the display unit AE, and this control signal indicates a request for a brightness selection and/or for a color selection of partial areas of the display area AB as a function of the distance information and the horizontal rotational orientation information.

Figure 2B:
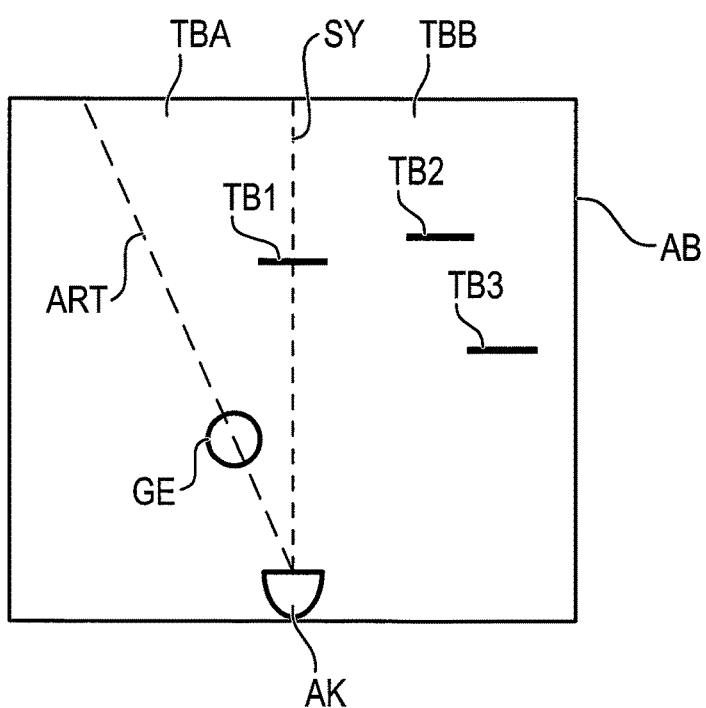
FIG. 2b is a schematic view showing a first variant of a display area.

FIG. 2b shows the display area AB, in which a position of the head protection device is indicated preferably by means of a symbol AK.

Depending on the distance information obtained and the horizontal rotational orientation information obtained, which were obtained, for example, relative to the objects O1, O2 and O3 according to FIG. 2a, a brightness selection and/or a color selection of corresponding partial areas TB1, TB2, TB3 are performed in the display area AB. Consequently, the user is offered information through this representation in the display area AB, from which he can derive the horizontal rotational orientation and the distance in which an object is to be expected.

It is preferably indicated to the user for a current horizontal rotational orientation ART along an axis indicated correspondingly schematically in what direction the head protection device is currently rotated horizontally. This is preferably displayed to the user by a predefined geometric element GE being displayed in the direction of the current rotational orientation ART.

The representation in FIG. 2b shows a selection of the display area AB, in which the image shown in the image area AB is not rotated based on a horizontal rotational change of the head protection device. If the representation is selected in the display area AB as is shown according to FIG. 2b, the display area AB can be divided in two partial areas TBA, TBB of equal size on the basis of a symmetry axis SY.

Figure 2C:
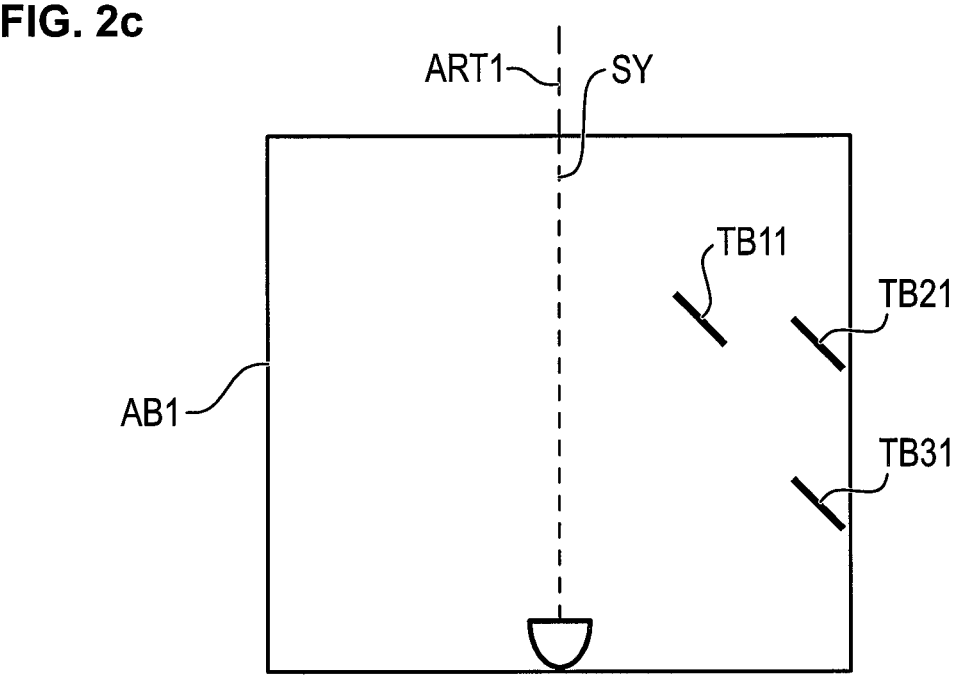
FIG. 2c is a schematic view showing a second variant of a display area.

FIG. 2c shows a selection of the display area AB1, in which selection a representation of distance information relative to a current rotational orientation ART1 of the head protection device K always takes place relative to a current rotational orientation ART1 of the head protection device K along a symmetry axis SY, so that other distance information and corresponding horizontal rotational orientation information are displayed such that the partial areas TB1, TB2, TB3 according to FIG. 2B are represented as partial areas TB11, TB21, TB31 rotated in relation to the symmetry axis SY in the display area AB1. This corresponds to a representation of the so-called augmented reality.

The control unit is preferably configured to change over into the second operating mode when an indicator for a change over time in the horizontal rotational orientation exceeds a predefined threshold value. This is preferably achieved by the control unit being configured to change over into the second operating mode when an absolute value of a difference of two horizontal rotational orientation information values exceeds a predefined threshold value within a predefined maximum duration.

FIG. 3b shows in this connection a possible curve describing the horizontal rotational orientation information RI1 over the time t.

Two horizontal rotational orientation information values RI1W2, RI1W1 within a predefined maximum duration T2 result in an absolute value of their difference, which value exceeds a predefined threshold value SW2. This exceeding can be determined, for example, by means of the relationship $$|RI1W2(t2)-RI1W2(t1)|>SW2.$$

In case the absolute value of the difference over time between the two horizontal rotational orientation information values RI1W2, RI1W1 is exceeded within the predefined maximum duration T2, the control unit automatically changes over into the second operating mode. This is advantageous, because a rapid increase or else a rapid drop in the horizontal rotational orientation information can be brought about by the user by a so-called shaking of the head in order to then reach automatically the second operating mode for using the display unit. A control signal S3, as it is shown in FIG. 1, which indicates a request for switching on or activating the display unit AE, is preferably provided at the time of switchover into the second operating mode by the control unit.

As was explained above, the display area AB from FIG. 2b can be divided into two partial areas TBA, TBB of equal size on the basis of a symmetry axis SY. If the control unit changes over into the second operating mode, it detects, immediately after the threshold value SW2 is exceeded or at the time of changeover into the second operating mode, existing current horizontal rotational orientation information together with distance information associated with the horizontal rotational orientation information. A brightness selection and/or a color selection of a partial area located on the symmetry axis, according to FIG. 2b the partial area TB1, is then selected as a function of this current horizontal rotational orientation information and the distance information associated therewith. This is advantageous because when the second operating mode is activated, preferably by the so-called gesture in the form of the user shaking his head, a display in the display area AB is standardized such that distance information detected directly on changeover into the second operating mode or immediately when the gesture in the form of shaking the head is performed is always displayed along the symmetry axis SY.

The brightness selection requested by means of the second control signal S2 and/or the color selection requested by means of the second control signal S2 for displaying the partial areas TB1, TB2, TB3, TB11, TB21, TB31 preferably takes place such that the brightness selection and/or the color selection changes as a function of the continuing time. As was already mentioned before, distance information originating from a more remote past can be hidden from the display area AB, AB1.

The head protection device K shown in FIG. 1 preferably has a temperature-measuring device TS with a spatial directional characteristic FB2. This directional characteristic FB2 is also shown in FIG. 2a in the top view of the area EB in which the rescue operation is being carried out. The temperature-measuring device TS is preferably positioned or fastened on the head protection device K such that the focusing ranges FB1 and FB2 essentially coincide and have an identical spatial orientation.

The control unit SE is configured to set a temporal relationship between temperature information TI, which is provided by the temperature-measuring device TS, and the horizontal rotational orientation information.

The control unit SE selects the second control signal S2 such that the second control signal S2 indicates a request for a color selection of the partial areas TB1, TB2, TB3, TB11, TB22, TB31 as a function of the temperature information TI and the horizontal rotational orientation information RI1.

The control unit SE is preferably configured to select the control signal S1 on the basis of the temperature information TI such that the control signal S1 indicates, further, a request for a color selection of the light beam as a function of the temperature information TI.

As a result, a change in the color of the light beam is selected as a function of a temperature present in the focusing range FB2 of the temperature-measuring device TS.

The control unit SE preferably limits the distance information EI to a predefined maximum. It is achieved hereby that only distance information EI that represents a distance that is meaningful for the area EB in which the rescue operation is being carried out is taken into account.

The control unit SE is preferably configured to determine whether an indicator for a change over time in the horizontal rotational orientation is lastingly below a predefined threshold value for a predefined duration, and to provide to the display unit an additional control signal, which indicates a request for switching off the display unit in case it is below the predefined threshold value. This is achieved especially by the control unit SE being configured to determine whether a first derivative of the horizontal rotational orientation information is lastingly below a predefined threshold value within a predefined duration and to provide to the display unit an additional control signal, which indicates a request for switching off the display unit (AE), if it is below the predefined threshold value. FIG. 3c shows for this a possible change in the horizontal rotational orientation information RI1, in which the two values RI1W4 and RI1W3 as well as values located between them are such that the first time derivative is lastingly below a predefined threshold value.

This is preferably determined on the basis of the relationship $$\frac{dRI1}{dt} < SW3 \forall\, t \in T3.$$

If this falling below is detected by the control unit, the control unit SE provides an additional control signal S3 to the display unit AE, which control signal indicates a request for switching off the display unit AE. The control unit SE then preferably also further provides a control signal S5 to the light beam generation device L, and this control signal indicates a request for switching off the light beam generation device L.

It is advantageously made possible hereby that a user can automatically switch off the display unit and/or the light beam generation device by not moving his head and thus by maintaining the head protection device in a resting position for a predefined time period T3. The second operating mode is then preferably ended hereby. This is then preferably automatically followed by a changeover into the first operating mode.

The at least one acceleration or angular rate sensor SEN from FIG. 1 is preferably configured to provide additional acceleration or angular rate information B2 relative to a vertical rotation VR of the head protection device K about an axis of rotation VRA of a vertical rotation to the control unit SE.

In a third operating mode, the control unit SE is configured to determine vertical rotational orientation information RI2 on the basis of the information B2. The control unit SE further sets this vertical rotational orientation information RI2 into a temporal relationship with the distance information EI.

The control unit SE then selects in the third operating mode the control signal S2 such that the control signal S2 indicates a request for a brightness selection and/or for a color selection of partial areas of the display area as a function of the distance information EI and of rotational orientation information RI2.

Figure 4:
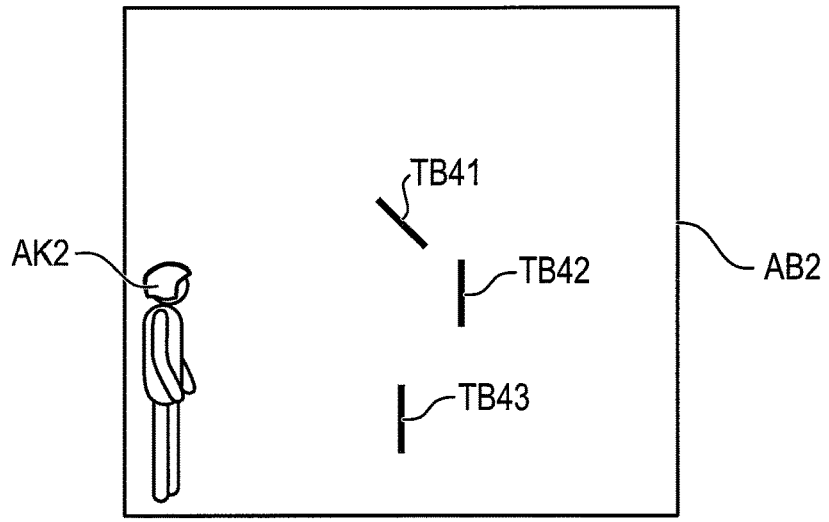
FIG. 4 is a schematic view showing a third variant of a display area.

As is shown in FIG. 4, a brightness selection and/or a color selection of the partial areas TB41, TB42, TB43 is then performed in a display area AB2 as a function of the distance information and the vertical rotational orientation information. A position of the head protection device is preferably indicated by means of a symbol AK2.

The control unit SE preferably changes automatically over into the third operating mode when an indicator for a change over time in the vertical rotational orientation exceeds a predefined threshold value within a predefined maximum duration. The control unit SE changes automatically over into the third operating mode especially when an absolute value of a difference over time between two vertical rotational orientation information values exceeds a predefined threshold value within a predefined maximum duration T4.

FIG. 3d shows for this a change in the vertical rotational orientation information RI2. The rotational orientation information values RI2W2 and RI2W1 are such that the absolute value of their difference within the duration T4 exceeds the predefined threshold value SW4. This is preferably determined by the relationship $$|RI1W2(t2) - RI2W1(t1)| > SW4.$$

As a result, the user can consequently automatically change over into the third operating mode by performing a rapid change in the vertical rotational orientation of the head protection device preferably by means of a so-called gesture in the form of nodding, so that he does not have to operate any key or switch by means of his hands or his fingers to reach the third operating mode.

The head protection device is preferably configured such that the control unit is configured to detect whether the vertical rotational orientation information is below a predefined threshold value and whether the distance information at the same time exceeds a predefined threshold value and to select the second control signal in case of detection that the second control signal indicates a request for outputting an optical warning.

The head protection device is preferably configured such that the control unit is configured to detect whether the distance information is below a predefined threshold value and to select the second control signal in case of detection such that the second control signal indicates a request for outputting an optical warning.

The invention being disclosed here may also be provided by a retrofitting kit NR shown in the figure, which is to be attached to a conventional head protection device. The retrofitting kit may be attached to a conventional head protection device by means of a fastening element, such as a clamping connection, a screw connection, a locking connection or another mechanical connection.

The retrofitting kit NR according to the present invention has at least the distance-measuring device E, the light beam generation device L as well as the control unit SE, which are shown here. The retrofitting kit NR preferably further has the acceleration or angular rate sensor SE as well as the display unit AE. Further, the retrofitting kit NR preferably also has the temperature-measuring device TS.

The control unit SE shown in FIG. 1 may be embodied as one or more control and/or computing units.

The function of the control unit SE may be provided by corresponding hardware in the form of a processor. The hardware is preferably hardware that executes software in the form of program code. A processor may be embodied here in the form of an individual processor or of a system of a plurality of processors. The term "processor" shall not be considered here exclusively to be pure hardware for executing software, but it may also be implemented as a digital signal processor (DSP), an Application Specific Integrated Circuit (ASIC), a Field Programmable Gate Array (FPGA) or as another type of hardware implementation. The mentioned configuration of the processor may take place by installing software on the processor at the time of the manufacture of the processor, or else by supplying a communication unit with processor and enclosing a medium with a computer program product, which can then be installed on the processor.

The memory unit MEM is preferably a memory unit integrated in the control unit SE. As an alternative, the memory unit MEM may be a memory unit that is separate from the control unit SE and is then connected to the control unit SE in order to provide the data stored in the memory unit MEM, preferably the characteristic KL.

While specific embodiments of the invention have been shown and described in detail to illustrate the application of the principles of the invention, it will be understood that the invention may be embodied otherwise without departing from such principles.

What is claimed is:

1. A head protection device comprising:
   a distance-measuring device with a spatial directional characteristic, the distance-measuring device being configured to determine distance information relative to a focusing range of the spatial directional characteristic and to provide the determined distance information;
   a light beam generation device configured to generate a light beam in a direction of the focusing range; and
   a control unit receiving the determined distance information from the distance-measuring device, in a first operating mode the control unit being configured to provide, on the basis of the determined distance information, a control signal for the light beam generation device, said control signal indicating a request for a brightness modulation frequency of the light beam as a function of the determined distance information.

2. A head protection device in accordance with claim 1, wherein the control unit is further configured to provide a switching off control signal, which indicates a request for switching off the light beam generation device, for the light beam generation device in a case in which the determined distance information is continuously below a predefined threshold value for a predefined duration.

3. A head protection device in accordance with claim 1, further comprising:
   at least one acceleration or angular rate sensor configured to provide acceleration information or angular rate information relative to a horizontal rotation of the head protection device to the control unit; and
   a display unit with a two-dimensional display area, wherein the control signal comprises a first control signal and the control unit is further configured:
   to determine rotational orientation information, which indicates a horizontal rotational orientation of the head protection device, based of the acceleration or angular rate information;
   to set the horizontal rotational orientation information into a temporal relationship with the distance information; and
   to provide, to the display unit, a second control signal, which indicates a request for a brightness selection or for a color selection, or for both a brightness selection and a color selection of partial areas of the display area as a function of the distance information and of the horizontal rotational orientation information in a second operating mode.

4. A head protection device in accordance with claim 3, wherein the control unit is configured to change over into the second operating mode when an indicator for a change over time in the horizontal rotational orientation exceeds a predefined threshold value.

5. A head protection device in accordance with claim 4, wherein:
   the display area has a symmetry axis dividing the display area into two partial areas of equal size; and
   the control unit is further configured:
   to detect current horizontal rotational orientation information present immediately after the exceeding of the predefined threshold value; and
   to select a brightness selection or a color selection or both a brightness selection and a color selection of a partial area located on the symmetry axis as a function of distance information associated with the current horizontal rotational orientation information in the second operating mode.

6. A head protection device in accordance with claim 3, wherein the brightness selection requested by means of the second control signal or the color selection requested by means of the second control signal or both the brightness selection requested by means of the second control signal and the color selection requested by means of the second control signal change as a function of a continuing time.

7. A head protection device in accordance with claim 3, wherein:
   the spatial directional characteristic is a first spatial directional characteristic;
   the head protection device further comprising a temperature-measuring device with a second spatial directional characteristic;
   the temperature-measuring device is configured to determine temperature information relative to a focusing range of the second spatial directional characteristic and to provide the determined temperature information to the control unit; and
   the control unit is further configured:
   to set the determined temperature information into a temporal relationship with the horizontal rotational orientation information; and
   to select the second control signal such that the second control signal indicates a request for a color selection of partial areas of the display area as a function of the determined temperature information and of the horizontal rotational orientation information.

8. A head protection device in accordance with claim 3, wherein the control unit is further configured to select the second control signal such that the control signal indicates a request for displaying a predefined two-dimensional geometric element as a function of current rotational orientation information.

9. A head protection device in accordance with claim 3, wherein the control unit is configured to determine whether an indicator for a change over time in the horizontal rotational orientation is lastingly below a predefined threshold value for a predefined duration, and to provide to the display unit, in case of falling below, an additional control signal, which additional control signal indicates a request for switching off the display unit.

10. A head protection device in accordance with claim 9, wherein the control unit is further configured to detect whether the determined distance information is below a predefined threshold value and to select the second control signal in case of detection such that the second control signal indicates a request for outputting an optical warning.

11. A head protection device in accordance with claim 3, wherein:
the at least one acceleration or angular rate sensor is further configured to provide additional acceleration or angular rate information relative to a vertical rotation of the head protection device to the control unit; and
the control unit is further configured:
to determine vertical rotational orientation information based on the additional acceleration or angular rate information;
to set the vertical rotational orientation information into a temporal relationship with the determined distance information; and
to select the second control signal such that the second control signal indicates a request for a brightness selection or a color selection or both a brightness selection and a color selection of partial areas of the display area as a function of the determined distance information and of the vertical rotational orientation information in a third operating mode.

12. A head protection device in accordance with claim 11, wherein the control unit is configured to change over into the third operating mode when an indicator for a change over time in the vertical rotational orientation exceeds a predefined threshold value within a predefined maximum duration.

13. A head protection device in accordance with claim 11, wherein the control unit is further configured:
to detect whether the vertical rotational orientation information is below a predefined threshold value and whether the distance information at the same time exceeds a predefined threshold value; and
to select the second control signal in case of detection such that the second control signal indicates a request for outputting an optical warning.

14. A head protection device in accordance with claim 1, wherein:
the spatial directional characteristic is a first spatial directional characteristic,
the head protection device further comprises a temperature-measuring device with a second spatial directional characteristic;
the temperature-measuring device is configured to determine temperature information relative to a focusing range of the second spatial directional characteristic and to provide the determined temperature information to the control unit; and
the control unit is further configured to select the control signal on the basis of the determined temperature information such that the control signal further indicates a request for a color selection of the light beam as a function of the determined temperature information.

15. A head protection device in accordance with claim 1, wherein the control unit is configured to limit the distance information to a predefined maximum.

16. A head protection device retrofitting kit for attachment to a head protection device, the head protection device retrofitting kit comprising:
a distance-measuring device with a spatial directional characteristic, the distance-measuring device being configured to determine distance information relative to a focusing range of the spatial directional characteristic;
a light beam generation device configured to generate a light beam in a direction of the focusing range; and
a control unit receiving the determined distance information from the distance-measuring device, the control unit providing a control signal, which indicates a request for a brightness modulation frequency of the light beam as a function of the determined distance information, to the light beam generation device based on the determined distance information in a first operating mode.

17. A head protection device retrofitting kit in accordance with claim 16, further comprising:
at least one acceleration or angular rate sensor configured to provide acceleration or angular rate information relative to a horizontal rotation of the head protection device to the control unit; and
a display unit with a two-dimensional display area, wherein:
the control signal is a first control signal;
the control unit is further configured:
to determine rotational orientation information, which indicates a horizontal rotational orientation of the head protection device on the basis of the acceleration or angular rate information;
to set the horizontal rotational orientation information into a temporal relationship with the distance information; and
to provide for the display unit a second control signal, which second control signal indicates a request for a brightness selection or a color selection or both a brightness selection and a color selection of partial areas of the display area as a function of the distance information and of the horizontal rotational orientation information, in a second operating mode.

18. A head protection device retrofitting kit in accordance with claim 17, wherein:
the spatial directional characteristic is a first spatial directional characteristic;
the head protection device retrofitting kit further comprises a temperature-measuring device with a second spatial directional characteristic;
the temperature-measuring device is configured to determine temperature information relative to a focusing range of the second spatial directional characteristic and to provide the temperature information to the control unit;
the control unit is further configured:
to set the temperature information into a temporal relationship with the rotational orientation information; and to select the second control signal such that the second control signal indicates a request for a color selection of partial areas of the display area as a function of the temperature information and of the horizontal rotational orientation information.

* * * * *